US012487621B2

(12) United States Patent
Feng et al.

(10) Patent No.: US 12,487,621 B2
(45) Date of Patent: Dec. 2, 2025

(54) LOW DROPOUT REGULATOR

(71) Applicant: Realtek Semiconductor Corporation, Hsinchu (TW)

(72) Inventors: Yi Feng, Hsinchu (TW); Hsueh-Yu Kao, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 358 days.

(21) Appl. No.: 18/180,868

(22) Filed: Mar. 9, 2023

(65) Prior Publication Data

US 2024/0126314 A1 Apr. 18, 2024

(30) Foreign Application Priority Data

Oct. 18, 2022 (TW) ................................ 111139493

(51) Int. Cl.
*G05F 1/575* (2006.01)
*G05F 3/26* (2006.01)

(52) U.S. Cl.
CPC ................ *G05F 1/575* (2013.01); *G05F 3/26* (2013.01)

(58) Field of Classification Search
CPC .................................. G05F 3/26; G05F 1/575
See application file for complete search history.

(56) References Cited

U.S. PATENT DOCUMENTS 9,541,934 B2 1/2017 Wei
11,531,361 B2 * 12/2022 Joshi ........................ G05F 1/56
11,573,585 B2 * 2/2023 Wang ........................ G05F 1/59
2017/0293313 A1 * 10/2017 Wang .................. H03F 3/45071
2022/0100217 A1 * 3/2022 Jiang ....................... G05F 1/575

FOREIGN PATENT DOCUMENTS

CN 114840046 A 8/2022

OTHER PUBLICATIONS

K. Joshi et al., A 5.6 μA Wide Bandwidth, High Power Supply Rejection Linear Low-Dropout Regulator With 68 dB of PSR Up To 2 Mhz. IEEE Journal of Solid-State Circuits. pp. 1-10., 2020, doi: 10.1109/JSSC.2020.2978033.

* cited by examiner

*Primary Examiner* — Thienvu V Tran
*Assistant Examiner* — Gabriel Alexander Rurycz
(74) *Attorney, Agent, or Firm* — CKC & Partners Co., LLC

(57) ABSTRACT

A low dropout regulator includes output terminal circuit and amplifier. The output terminal circuit is configured to generate output voltage according to input voltage and is configured to generate feedback voltage according to the output voltage. The amplifier is configured to generate control voltage to the output terminal circuit according to reference voltage and the feedback voltage, so as to adjust the output voltage, wherein the amplifier includes input stage circuit, current mirror circuit and filter circuit. The input stage circuit is configured to receive the reference voltage and the feedback voltage to generate a differential output. The filter circuit is configured to filter the input voltage to generate dependent current related to noise of the input voltage on the current mirror circuit, wherein the current mirror circuit is configured to output the control voltage according to the differential output and the dependent current.

20 Claims, 4 Drawing Sheets

100

LOW DROPOUT REGULATOR

CROSS-REFERENCE TO RELATED APPLICATION

This application claims priority to Taiwan Application Serial Number 111139493, filed Oct. 18, 2022, which is herein incorporated by reference in its entirety.

BACKGROUND

Field of Invention

This disclosure relates to a regulator, and in particular to a low dropout regulator.

Description of Related Art

Following the development of the low dropout regulator, some approaches for improving the power supply rejection ratio are successively proposed. Some approaches are increasing the capacitance of the decoupling capacitors in the low dropout regulator, but these approaches would result in occupying a larger amount of circuit area. Other approaches is adding extra circuits to the low dropout regulator for compensation, but these approaches also result in the increased power consumption of the low dropout regulator, and even cause latch up. Therefore, how to improve the power supply rejection ratio is one of the problems being continuously studied in this field.

SUMMARY

An aspect of present disclosure relates to a low dropout regulator. The low dropout regulator includes an output terminal circuit and an amplifier. The output terminal circuit is configured to generate an output voltage according to an input voltage and is configured to generate a feedback voltage according to the output voltage. The amplifier is configured to generate a control voltage to the output terminal circuit according to a reference voltage and the feedback voltage, so as to adjust the output voltage, wherein the amplifier includes an input stage circuit, a current mirror circuit and a filter circuit. The input stage circuit is configured to receive the reference voltage and the feedback voltage to generate a differential output. The current mirror circuit is coupled to the input stage circuit. The filter circuit is coupled to the current mirror circuit and is configured to filter the input voltage to generate a dependent current related to a noise of the input voltage on the current mirror circuit, wherein the current mirror circuit is configured to output the control voltage according to the differential output and the dependent current.

Another aspect of present disclosure relates to a low dropout regulator. The low dropout regulator includes an output terminal circuit and an amplifier. The output terminal circuit is configured to generate an output voltage according to an input voltage and is configured to generate a feedback voltage according to the output voltage. The amplifier is configured to generate a control voltage to the output terminal circuit according to a reference voltage and the feedback voltage, so as to adjust the output voltage, wherein the amplifier includes an input stage circuit, a current mirror circuit and a filter circuit. The input stage circuit is configured to receive the reference voltage and the feedback voltage to generate a differential output. The current mirror circuit is coupled to a first node and a second node with the input stage circuit to receive the differential output and includes a bias circuit coupled to the first node. The filter circuit is coupled to the bias circuit and is configured to filter the input voltage, so that the bias circuit generates a dependent current related to a noise of the input voltage, wherein the current mirror circuit is configured to output the control voltage according to the differential output and the dependent current.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
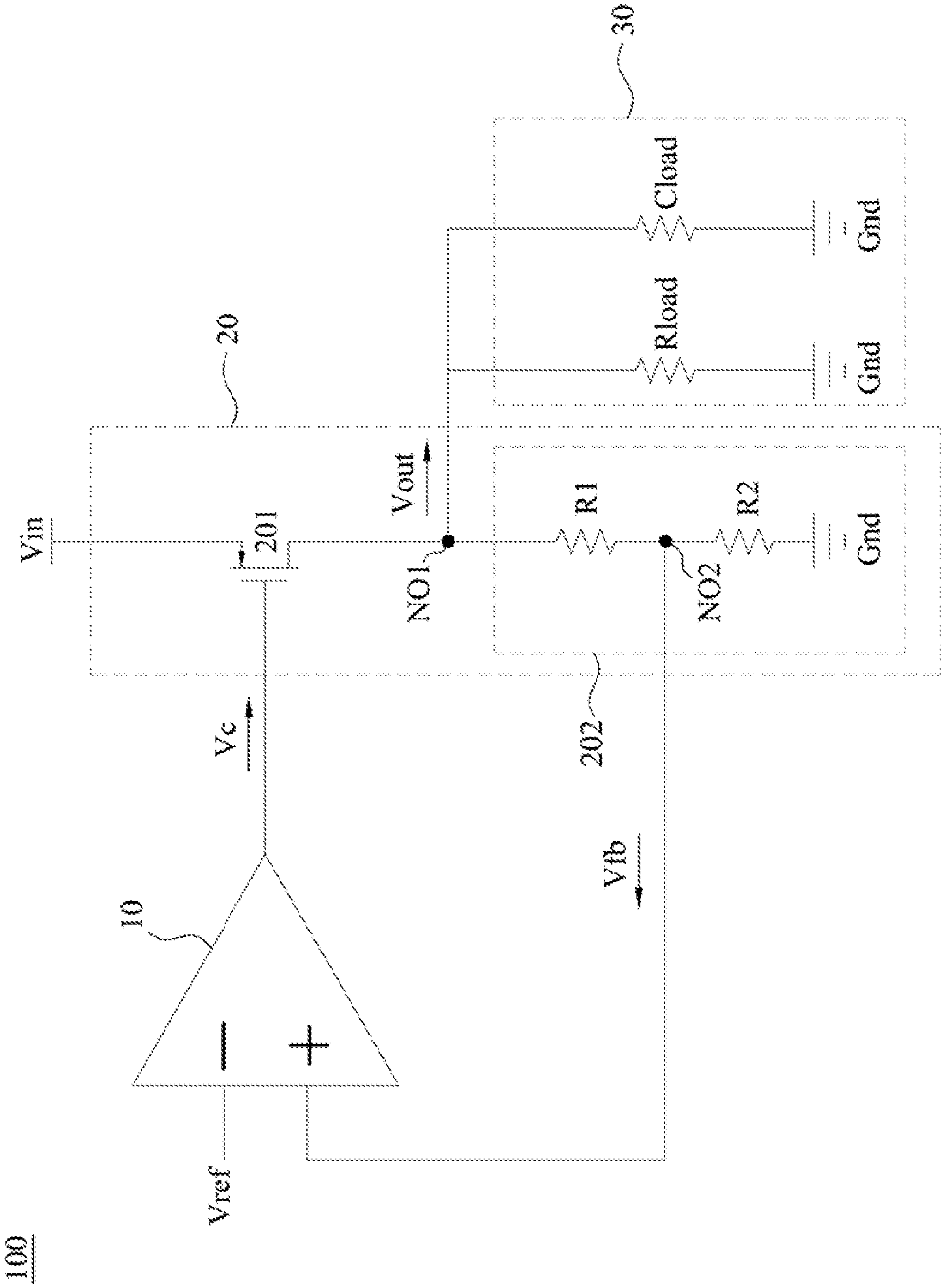
FIG. 1 is a schematic diagram of a low dropout regulator in accordance with some embodiments of the present disclosure.

Referring to FIG. 1, FIG. 1 is a schematic diagram of a low dropout regulator 100 in accordance with some embodiments of the present disclosure. The low dropout regulator 100 includes an amplifier 10 and an output terminal circuit 20. In some embodiments, the low dropout regulator 100 is configured to receive an input voltage Vin provided by a voltage source (not shown). It should be appreciated that the input voltage Vin may be unstable. Notably, after receiving the input voltage Vin, the low dropout regulator 100 can convert the input voltage Vin into an output voltage Vout for outputting.

As shown in FIG. 1, the low dropout regulator 100 can provide the output voltage Vout to a load circuit 30 by the output terminal circuit 20. In some embodiments, the load circuit 30 is coupled to a first output node NO1 of the output terminal circuit 20 and includes a load resistor Rload and a load capacitor Cload. In particular, the load resistor Rload and the load capacitor Cload are connected in parallel between the first output node NO1 and a ground voltage Gnd.

In some embodiments, as shown in FIG. 1, the output terminal circuit 20 is coupled to the amplifier 10 and includes a power transistor 201 and a feedback circuit 202.

In particular, a control terminal (e.g., a gate terminal) of the power transistor 201 is coupled to an output terminal of the amplifier 10, a first terminal (e.g., a source terminal) of the power transistor 201 is configured to receive the input voltage Vin, and a second terminal (e.g., a drain terminal) of the power transistor 201 is coupled to the first output node NO1.

In some embodiments, the feedback circuit 202 is coupled to the first output node NO1 and includes a first resistor R1 and a second resistor R2. In particular, the first resistor R1 is coupled between the first output node NO1 and a second output node NO2, the second resistor R2 is coupled between the second output node NO2 and the ground voltage Gnd, and the second output node NO2 is coupled to the amplifier 10.

During the operation of the low dropout regulator 100, as shown in FIG. 1, the power transistor 201 is configured to generate the output voltage Vout on the first output node NO1 according to the input voltage Vin. Then, the feedback circuit 202 is configured to generate a feedback voltage Vfb on the second output node NO2 for providing to an input terminal (e.g., a positive input terminal) of the amplifier 10 according to the output voltage Vout. Another input terminal (e.g., a negative input terminal) of the amplifier 10 is configured to receive a reference voltage Vref.

In some embodiments, the low dropout regulator 100 is configured to maintain the output voltage Vout at a predetermined voltage level, and the voltage level of the reference voltage Vref can be set according to the predetermined voltage level of the output voltage Vout, the resistance of the first resistor R1 and the resistance of the second resistor R2. For example, the predetermined voltage level is 3.6V, the resistance of the first resistor R1 is 10 kΩ, and the resistance of the second resistor R2 is 20 kΩ. Accordingly, the voltage level of the reference voltage Vref can be set to be 2.4V.

According to the above descriptions, when the voltage level of the output voltage Vout is 4.2V, the voltage level of the feedback voltage Vfb outputted by the feedback circuit 202 is 2.8V. In other words, the feedback voltage Vfb and the reference voltage Vref are different. At this time, the amplifier 10 generates a control voltage Vc to the control terminal of the power transistor 201 according to a difference between the reference voltage Vref and the feedback voltage Vfb, and the power transistor 201 adjusts the voltage level of the output voltage Vout back to the predetermined voltage level according to the control voltage Vc. As can be seen from the above descriptions, when the voltage level of the output voltage Vout is different from the predetermined voltage level, the low dropout regulator 100 can adjust the voltage level of the output voltage Vout to stabilize the output voltage Vout.

Figure 2:
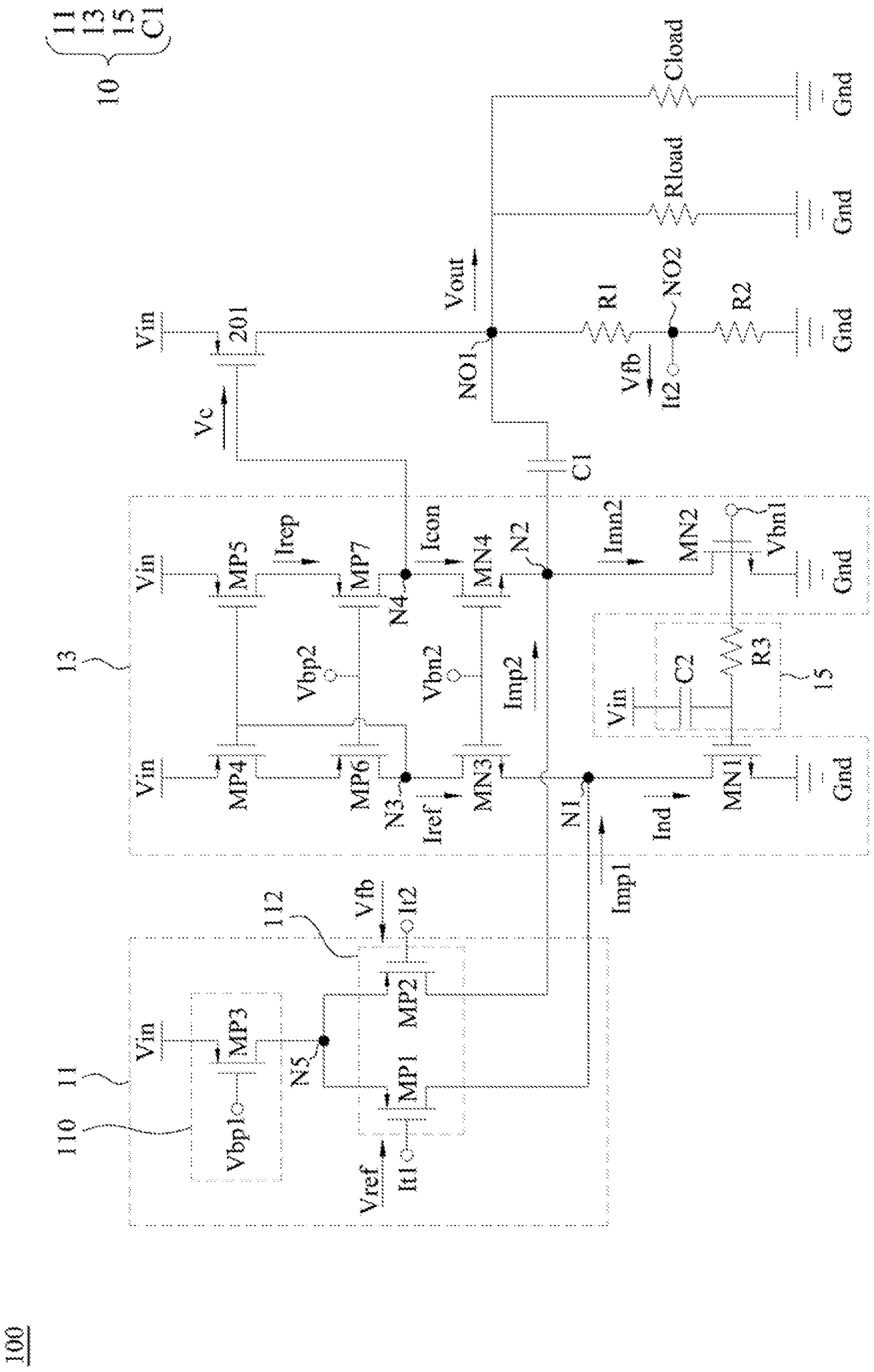
FIG. 2 is a schematic diagram of a low dropout regulator in accordance with some embodiments of the present disclosure.

Referring to FIG. 2, FIG. 2 is a schematic diagram of the low dropout regulator 100 in accordance with some embodiments of the present disclosure. In some embodiments, the amplifier 10 includes an input stage circuit 11, a current mirror circuit 13 and a filter circuit 15, in which the current mirror circuit 13 is coupled to the input stage circuit 11, and the filter circuit 15 is coupled to the current mirror circuit 13.

In some embodiments, the input stage circuit 11 includes a bias circuit 110 and a differential input transistor pair 112. As shown in FIG. 2, the differential input transistor pair 112 is coupled with the current mirror circuit 13 at a node N1 and a node N2 and is coupled with the bias circuit 110 at a node N5. A first input terminal 10 of the differential input transistor pair 112 is configured to receive the reference voltage Vref, and a second input terminal It2 of the differential input transistor pair 112 is coupled to the second output node NO2 of the output terminal circuit 20 to receive the feedback voltage Vfb.

In the embodiments of FIG. 2, the differential input transistor pair 112 includes a transistor MP1 and a transistor MP2. In particular, a control terminal of the transistor MP1 is coupled to the first input terminal 10 of the differential input transistor pair 112, a first terminal of the transistor MP1 is coupled to the node N5, and a second terminal of the transistor MP1 is coupled to the node N1. A control terminal of the transistor MP2 is coupled to the second input terminal It2 of the differential input transistor pair 112, a first terminal of the transistor MP2 is coupled to the node N5, and a second terminal of the transistor MP2 is coupled to the node N2.

In the embodiments of FIG. 2, the bias circuit 110 includes a transistor MP3. In particular, a control terminal of the transistor MP3 is configured to receive a bias voltage Vbp1, a first terminal of the transistor MP3 is configured to receive the input voltage Vin, and a second terminal of the transistor MP3 is coupled to the node N5. In other words, the bias circuit 110 is coupled between the node N5 and the input voltage Vin.

In some embodiments, the current mirror circuit 13 includes a plurality of transistors MN1-MN4 and MP4-MP7. As shown in FIG. 2, a control terminal of the transistor MN1 is coupled to the filter circuit 15, a first terminal of the transistor MN1 is configured to receive the ground voltage Gnd, and a second terminal of the transistor MN1 is coupled to the node N1. A control terminal of the transistor MN2 is configured to receive a bias voltage Vbn1, a first terminal of the transistor MN2 is configured to receive the ground voltage Gnd, and a second terminal of the transistor MN2 is coupled to the node N2.

A control terminal of the transistor MP4 is coupled to a node N3, a first terminal of the transistor MP4 is configured to receive the input voltage Vin, and a second terminal of the transistor MP4 is coupled to the node N3 through the transistor MP6. A control terminal of the transistor MP5 is coupled to a node N3, a first terminal of the transistor MP5 is configured to receive the input voltage Vin, and a second terminal of the transistor MP5 is coupled to a node N4 through the transistor MP7. In addition, the control terminal of the power transistor 201 is also coupled to the node N4.

According to the above descriptions, a first terminal of the transistor MP6 is coupled to the second terminal of the transistor MP4, and a second terminal of the transistor MP6 is coupled to the node N3. A first terminal of the transistor MP7 is coupled to the second terminal of the transistor MP5, and a second terminal of the transistor MP7 is coupled to the node N4. In addition, a control terminal of the transistor MP6 and a control terminal of the transistor MP7 both are configured to receive a bias voltage Vbp2.

A first terminal of the transistor MN3 is coupled to the node N1, and a second terminal of the transistor MN3 is coupled to the node N3. That is, the node N3 is coupled to the node N1 through the transistor MN3. A first terminal of the transistor MN4 is coupled to the node N2, and a second terminal of the transistor MN4 is coupled to the node N4. That is, the node N4 is coupled to the node N2 through the transistor MN4. In addition, a control terminal of the transistor MN3 and a control terminal of the transistor MN4 both are configured to receive a bias voltage Vbn2.

In the embodiments of FIG. 2, the bias voltage Vbp1 is greater than the bias voltage Vbp2, the bias voltage Vbp2 is greater than the bias voltage Vbn2, and the bias voltage Vbn2 is greater than the bias voltage Vbn1.

In some embodiments, as shown in FIG. 2, the amplifier 10 further includes a capacitor C1, and the capacitor C1 is coupled between the node N2 and the first output node NO1 of the output terminal circuit 20.

In some embodiments, the filter circuit 15 is a high-pass filter circuit. As shown in FIG. 2, the filter circuit 15 includes a capacitor C2 and a resistor R3. In particular, the capacitor C2 is coupled between the control terminal of the transistor MN1 and the input voltage Vin, and the resistor R3 is coupled between the control terminal of the transistor MN1 and the bias voltage Vbn1. It should be appreciated that the filter circuit 15 of the present disclosure is not limited to the structure shown in FIG. 2, and any circuits capable of high-pass filtering can be used to implement the filter circuit 15 of the present disclosure.

During the operation of the amplifier 10, the bias circuit 110 is configured to provide a bias current (not shown) to the differential input transistor pair 112 according to the bias voltage Vbp1. Accordingly, the differential input transistor pair 112 generates a differential output to the node N1 and the node N2 according to the reference voltage Vref and the feedback voltage Vfb. In detail, the transistor MP1 generates an operating current Imp1 of the differential output to the node N1 according to the reference voltage Vref, and the transistor MP2 generates an operating current Imp2 of the differential output to the node N2 according to the feedback voltage Vfb. In addition, it can be seen from the above descriptions that the current mirror circuit 13 receives the differential output generated by the input stage circuit 11 from the node N1 and the node N2.

The filter circuit 15 is configured to filter the input voltage Vin. As should be understood, because the filter circuit 15 of FIG. 2 is the high-pass filter circuit as well as the output terminal of the filter circuit 15 is coupled to the control terminal of the transistor MN1, the voltage component of the control terminal of the transistor MN1 would include high-frequency noise of the input voltage Vin. Therefore, a dependent current Ind generated by the transistor MN1 according to the voltage of its control terminal would reflect the high-frequency noise of the input voltage Vin. That is, the dependent current Ind is related to the high-frequency noise of the input voltage Vin.

As can be seen from the Kirchhoff current law, the dependent current Ind leaving the node N1 is equal to a sum of the operating current Imp1 and a first reference current Iref which are entering the node N1, in which the first reference current Iref is flowing from the node N3 to the node N1 through the transistor MN3. According to the above descriptions, the first reference current Iref is the dependent current Ind minus the operating current Imp'. That is, the first reference current Iref is related to the dependent current Ind.

The current mirror circuit 13 is configured to generate a replica current Irep on the second terminal of the transistor MP5 according to the first reference current Iref. As shown in FIG. 2, the replica current Irep is flowing to the node N4 through the transistor MP7.

In addition, the transistor MN2 is configured to generate a bias current Imn2 on the node N2. As can be seen from the Kirchhoff current law, the bias current Imn2 leaving the node N2 is equal to a sum of the operating current Imp2 and a second reference current Icon which are entering the node N2, in which the second reference current Icon is flowing from the node N4 to the node N2 through the transistor MN4. According to the above descriptions, the second reference current Icon is the bias current Imn2 minus the operating current Imp2.

Accordingly, the current mirror circuit 13 is configured to compare the replica current Irep and the second reference current Icon, and is configured to generate the control voltage Vc at the node N4 for outputting to the power transistor 201 according to a result of comparison between the replica current Irep and the second reference current Icon. In particular, when the replica current Irep is greater than the second reference current Icon, the current mirror circuit 13 generates the higher control voltage Vc. When the replica current Irep is less than the second reference current Icon, the current mirror circuit 13 generates the lower control voltage Vc.

As can be seen from the above descriptions, the current mirror circuit 13 is configured to output the control voltage Vc to the power transistor 201 according to the differential output generated by the input stage circuit 11 and the dependent current Ind.

To further describe, because the replica current Irep is substantially equal to the first reference current Iref related to the dependent current Ind, the current mirror circuit 13 is regarded as correspondingly generating the control voltage Vc to the power transistor 201 according to the change in the high frequency noise of the input voltage Vin. For example, the control voltage Vc has positive correlation with the input voltage Vin, so as to stabilize the source-gate voltage of the power transistor 201. In such way, the effect of the high frequency noise of the input voltage Vin on the output voltage Vout generated by the power transistor 201 can be reduced. In some embodiments, the power supply rejection ratio (PSRR) of the low dropout regulator 100 is calculated by dividing the input voltage Vin by the output voltage Vout. Therefore, when the effect on the power transistor 201 is reduced, the PSRR of the low dropout regulator 100 is improved.

Figure 3:
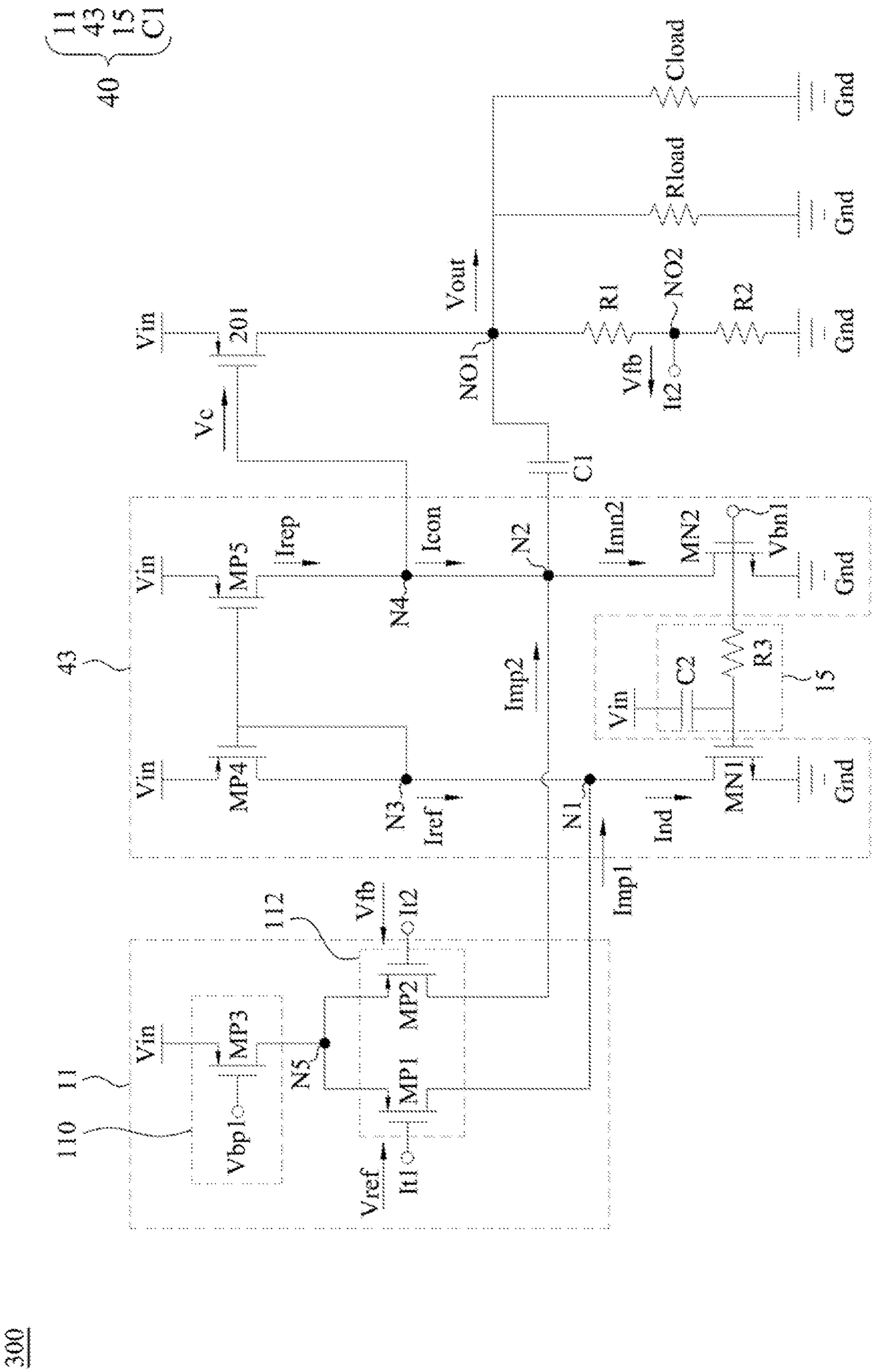
FIG. 3 is a schematic diagram of a low dropout regulator in accordance with some embodiments of the present disclosure.

It should be appreciated that the present disclosure is not limited to the structure shown in FIG. 2. For example, referring to FIG. 3, FIG. 3 is a schematic diagram of a low dropout regulator 300 in accordance with some embodiments of the present disclosure. The low dropout regulator 300 of FIG. 3 is differed from the low dropout regulator 100 of FIG. 2 in the structure of its amplifier 40. As shown in FIG. 3, the current mirror circuit 43 in the amplifier 40 is differed from the current mirror circuit 13 in FIG. 2. It can be seen from FIG. 3 that the current mirror circuit 43 does not include the transistors MP6-MP7 and MN3-MN4 in FIG. 2. Accordingly, in the embodiments of FIG. 3, the second terminal of the transistor MP4 is directly coupled to the node N3 and the node N1, and the second terminal of the transistor MP5 is directly coupled to the node N4, the node N2 and the control terminal of the power transistor 201. It should be appreciated that other arrangements and operations of the low dropout regulator 300 are similar to those of the embodiments of FIG. 2, therefore are omitted herein.

To further describe, in comparison with the amplifier 10 of FIG. 2, the amplifier 40 of FIG. 3 may have lower DC gain, but the PSRR of the low dropout regulator 300 is improved still.

It should be appreciated that the transistor MN1 can be regarded as a bias circuit of the current mirror circuits 13 and 43 in the above embodiments. Accordingly, in some embodiments, the filter circuit 15 is coupled to the bias circuit of the current mirror circuits 13 and 43, and is configured to filter the input voltage Vin, so that the bias circuit (i.e., the transistor MN1) of the current mirror circuits 13 and 43 generates the dependent current Ind flowing from the node N1 to the bias circuit.

In the above embodiments, the power transistor 201 and the transistors MP1-MP7 each is implemented by P-type metal oxide semiconductor (PMOS), the transistors MN1-MN4 each is implemented by N-type metal oxide semiconductor (NMOS), but the present disclosure is not limited herein.

Figure 4:
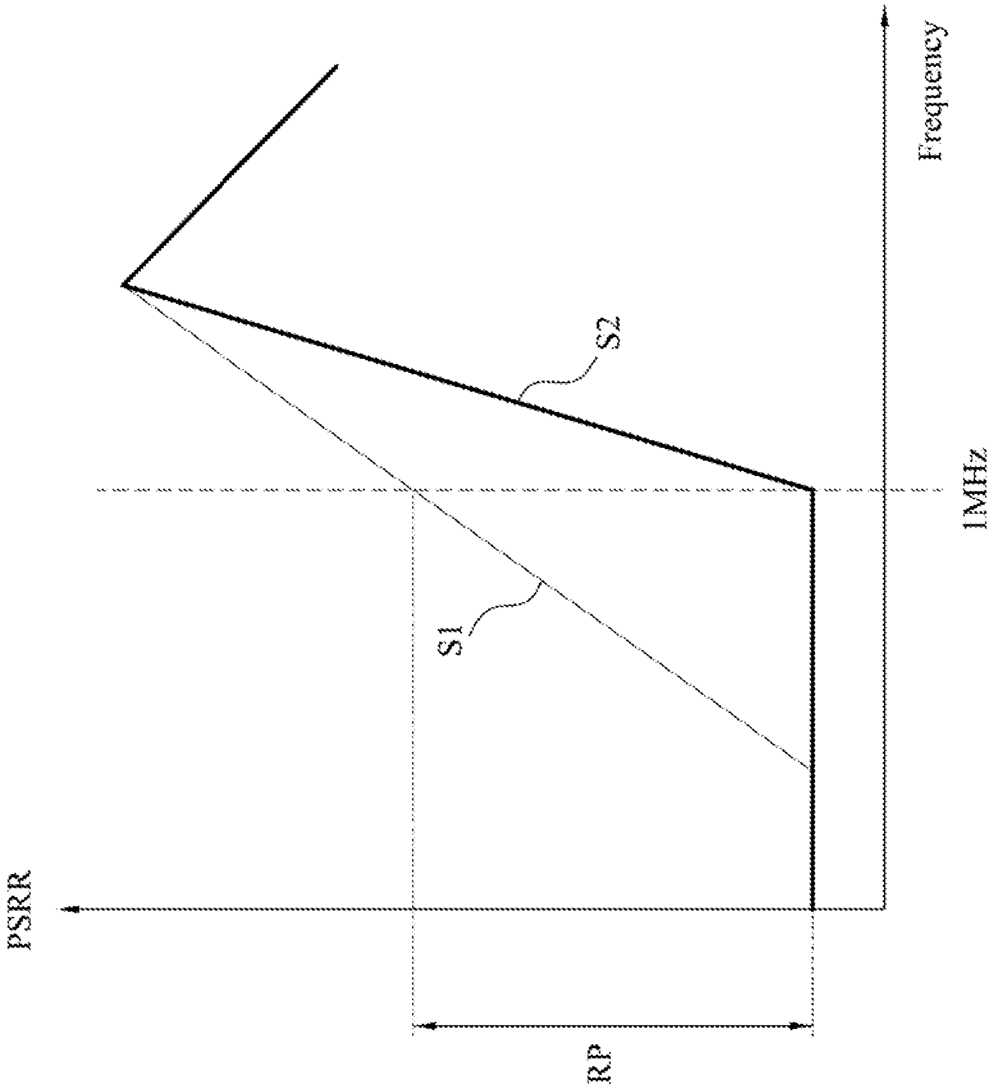
FIG. 4 is a schematic diagram of experimental data of the low dropout regulator in accordance with some embodiments of the present disclosure.

Referring to FIG. 4, FIG. 4 is a schematic diagram of experimental data of the low dropout regulator 100 in accordance with some embodiments of the present disclosure. As shown in FIG. 4, a curve S1 presents the PSRR of the low dropout regulator using known technologies at different frequencies, and a curve S2 presents the PSRR of the low dropout regulator 100 using the structure of the present disclosure at different frequencies. As can be seen from that, in comparison with the known technologies, the low dropout regulator 100 using the structure of the present disclosure has better PSRR at high frequency. For example, at the frequency of 1 MHz, a reduction RP in the PSRR of the low dropout regulator 100 in comparison with the known technologies is about 78.2%.

By adding the high-pass filter circuit into the amplifier, the low dropout regulator 100 of the present disclosure has the advantage of improved PSRR, occupying less circuit area and cost reduction.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A low dropout regulator, comprising:

an output terminal circuit configured to generate an output voltage according to an input voltage and configured to generate a feedback voltage according to the output voltage; and an amplifier configured to generate a control voltage to the output terminal circuit according to a reference voltage and the feedback voltage, so as to adjust the output voltage, wherein the amplifier comprises:

an input stage circuit configured to receive the reference voltage and the feedback voltage to generate a differential output;

a current mirror circuit coupled to the input stage circuit; and a filter circuit coupled to the current mirror circuit and configured to filter the input voltage to generate a dependent current related to a noise of the input voltage on the current mirror circuit, wherein the current mirror circuit is configured to output the control voltage according to the differential output and the dependent current.

2. The low dropout regulator of claim 1, wherein the current mirror circuit comprises a first transistor and a second transistor, a control terminal of the first transistor is coupled to the filter circuit, a first terminal of the first transistor is configured to receive a ground voltage, a second terminal of the first transistor is coupled to a first node, a control terminal of the second transistor is configured to receive a first bias voltage, a first terminal of the second transistor is configured to receive the ground voltage, and a second terminal of the second transistor is coupled to a second node.

3. The low dropout regulator of claim 2, wherein the current mirror circuit further comprises a third transistor and a fourth transistor, a control terminal of the third transistor and a control terminal of the fourth transistor are coupled to a third node, and a first terminal of the third transistor and a first terminal of the fourth transistor are configured to receive the input voltage.

4. The low dropout regulator of claim 3, wherein the current mirror circuit is configured to generate a replica current on a second terminal of the fourth transistor according to a first reference current related to the dependent current.

5. The low dropout regulator of claim 4, wherein the current mirror circuit is configured to compare the replica current with a second reference current flowing to the second node and is configured to generate the control voltage according to a comparison result of the replica current and the second reference current.

6. The low dropout regulator of claim 3, wherein a second terminal of the third transistor is coupled to the third node, the third node is coupled to the first node, and a second terminal of the fourth transistor is coupled to the second node and a control terminal of a power transistor of the output terminal circuit.

7. The low dropout regulator of claim 3, wherein the current mirror circuit further comprises a fifth transistor, a sixth transistor, a seventh transistor and an eighth transistor, a second terminal of the third transistor is coupled to the third node through the fifth transistor, the third node is coupled to the first node through the seventh transistor, a second terminal of the fourth transistor is coupled to a fourth node through the sixth transistor, and the fourth node is coupled to the second node through the eighth transistor, wherein a control terminal of a power transistor of the output terminal circuit is coupled to the fourth node.

8. The low dropout regulator of claim 7, wherein a control terminal of the fifth transistor and a control terminal of the sixth transistor are configured to receive a second bias voltage, a control terminal of the seventh transistor and a control terminal of the eighth transistor are configured to receive a third bias voltage, the second bias voltage is greater than the third bias voltage, and the third bias voltage is greater than the first bias voltage.

9. The low dropout regulator of claim 2, wherein the filter circuit comprises a capacitor and a resistor, the capacitor is coupled between the control terminal of the first transistor and the input voltage, and the resistor is coupled between the control terminal of the first transistor and the first bias voltage.

10. The low dropout regulator of claim 2, wherein the output terminal circuit comprises a power transistor, and the power transistor is configured to generate the output voltage on a first output node of the output terminal circuit according to the input voltage and is configured to adjust the output voltage according to the control voltage.

11. The low dropout regulator of claim 10, wherein a control terminal of the power transistor is configured to receive the control voltage from the current mirror circuit, a first terminal of the power transistor is configured to receive the input voltage, and a second terminal of the power transistor is coupled to the first output node.

12. The low dropout regulator of claim 10, wherein the output terminal circuit further comprises a feedback circuit, and the feedback circuit is coupled to the first output node and is configured to generate the feedback voltage on a second output node of the output terminal circuit according to the output voltage.

13. The low dropout regulator of claim 12, wherein the feedback circuit comprises a first resistor and a second resistor, the first resistor is coupled between the first output node and the second output node, the second resistor is coupled between the second output node and the ground voltage, and the second output node is coupled to the input stage circuit.

14. The low dropout regulator of claim 10, wherein the amplifier further comprises a capacitor, and the capacitor is coupled between the second node and the first output node.

15. The low dropout regulator of claim 2, wherein the input stage circuit comprises a differential input transistor pair, the differential input transistor pair is coupled to the first node, the second node and a third node, a first input terminal of the differential input transistor pair is configured to receive the reference voltage, and a second input terminal of the differential input transistor pair is coupled to a feedback circuit of the output terminal circuit to receive the feedback voltage, wherein the differential input transistor pair is configured to generate the differential output according to the reference voltage and the feedback voltage.

16. The low dropout regulator of claim 15, wherein a control terminal of a first transistor of the differential input transistor pair is coupled to the first input terminal of the differential input transistor pair, a first terminal of the first transistor of the differential input transistor pair is coupled to the third node, a second terminal of the first transistor of the differential input transistor pair is coupled to the first node, a control terminal of a second transistor of the differential input transistor pair is coupled to the second input terminal, a first terminal of the second transistor of the differential input transistor pair is coupled to the third node, and a second terminal of the second transistor of the differential input transistor pair is coupled to the second node, wherein the first transistor of the differential input transistor pair is configured to generate a first operating current of the differential output according to the reference voltage, and the second transistor of the differential input transistor pair is configured to generate a second operating current of the differential output according to the feedback voltage.

17. The low dropout regulator of claim 15, wherein the input stage circuit further comprises a bias circuit, and the bias circuit is coupled between the third node and the input voltage.

18. The low dropout regulator of claim 17, wherein a control terminal of a first transistor of the bias circuit is configured to receive a second bias voltage, a first terminal of the first transistor of the bias circuit is configured to receive the input voltage, a second terminal of the first transistor of the bias circuit is coupled to the third node, and the second bias voltage is greater than the first bias voltage.

19. The low dropout regulator of claim 1, wherein the filter circuit is a high-pass filter circuit.

20. A low dropout regulator, comprising:

an output terminal circuit configured to generate an output voltage according to an input voltage and configured to generate a feedback voltage according to the output voltage; and an amplifier configured to generate a control voltage to the output terminal circuit according to a reference voltage and the feedback voltage, so as to adjust the output voltage, wherein the amplifier comprises:

an input stage circuit configured to receive the reference voltage and the feedback voltage to generate a differential output;

a current mirror circuit coupled to a first node and a second node with the input stage circuit to receive the differential output and comprising a bias circuit coupled to the first node; and a filter circuit coupled to the bias circuit and configured to filter the input voltage, so that the bias circuit generates a dependent current related to a noise of the input voltage, wherein the current mirror circuit is configured to output the control voltage according to the differential output and the dependent current.

* * * * *